(12) United States Patent  (10) Patent No.: US 9,134,140 B2
Colledani et al.  (45) Date of Patent: Sep. 15, 2015

(54) PROTECTIVE SKIN FOR ROBOTS

(75) Inventors: Frédéric Colledani, Nanterre (FR); Xavier Lamy, Fontenay aux Roses (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 811 days.

(21) Appl. No.: 13/203,628

(22) PCT Filed: Feb. 26, 2010

(86) PCT No.: PCT/EP2010/052470
§ 371 (c)(1),
(2), (4) Date: Aug. 26, 2011

(87) PCT Pub. No.: WO2010/097459
PCT Pub. Date: Sep. 2, 2010

(65) Prior Publication Data
US 2011/0307097 A1    Dec. 15, 2011

(30) Foreign Application Priority Data
Feb. 27, 2009 (FR) ..................... 09 00896

(51) Int. Cl.
*G05B 19/18* (2006.01)
*G01D 5/16* (2006.01)
*G01D 5/241* (2006.01)
(Continued)

(52) U.S. Cl.
CPC ................ *G01D 5/16* (2013.01); *G01D 5/2417* (2013.01); *G01L 1/18* (2013.01); *G01L 1/205* (2013.01)

(58) Field of Classification Search
USPC ........ 604/500; 600/587; 428/195.1; 700/255, 700/79, 80, 81, 245, 246, 250, 258; 318/563, 566, 567; 73/862.627, 73/862.381, 862.52; 901/46
See application file for complete search history.

(56) References Cited

U.S. PATENT DOCUMENTS 5,287,748 A * 2/1994 Talmadge ..................... 73/769
5,510,812 A   4/1996 O'Mara et al.
(Continued)

FOREIGN PATENT DOCUMENTS

EP           1933461 A1   6/2008
WO      2008/066575 A2   6/2008
(Continued)

OTHER PUBLICATIONS

International Search Report of PCT/EP2010/052470, dated Jun. 6, 2010.

*Primary Examiner* — Ronnie Mancho
(74) *Attorney, Agent, or Firm* — Sughrue Mion, PLLC

(57) ABSTRACT

Detector device arranged to cover at least one portion of a mobile appliance; the device has an electromechanical transducer including a substrate, a first series of electrodes, a second series of electrodes, and a deformable layer associated with the electrodes of the two series, the substrate, the electrodes, and the deformable layer forming a single unit mounted on the portion of the mobile appliance and arranged so that a current flowing between one of the electrodes of the first series and an adjacent electrode of the second series is proportional to a thickness of the deformable layer in register with the electrodes. The substrate including a base layer to which are attached the electrodes of the first series and the electrodes of the second series, which have facing portions, and a variable conduction layer that covers the base layer and the electrodes.

10 Claims, 3 Drawing Sheets

(51) Int. Cl.
  *G01L 1/18* (2006.01)
  *G01L 1/20* (2006.01)

(56) References Cited

U.S. PATENT DOCUMENTS

| | | | |
|---|---|---|---|
| 6,407,553 B1 * | 6/2002 | Anderson et al. | 324/443 |
| 6,480,759 B1 * | 11/2002 | Ostwald et al. | 700/245 |
| 6,497,430 B1 * | 12/2002 | Odom et al. | 280/735 |
| 6,535,824 B1 * | 3/2003 | Mansky et al. | 506/8 |
| 6,688,185 B2 * | 2/2004 | Knox et al. | 73/862.045 |
| 6,778,867 B1 * | 8/2004 | Ziegler et al. | 700/79 |
| 7,141,812 B2 * | 11/2006 | Appleby et al. | 250/505.1 |
| 2008/0176046 A1 * | 7/2008 | Yamaguchi et al. | 428/195.1 |
| 2009/0076476 A1 * | 3/2009 | Barbagli et al. | 604/500 |

FOREIGN PATENT DOCUMENTS

| | | |
|---|---|---|
| WO | 2008/135787 A1 | 11/2008 |
| WO | 2009/023334 A2 | 2/2009 |

* cited by examiner

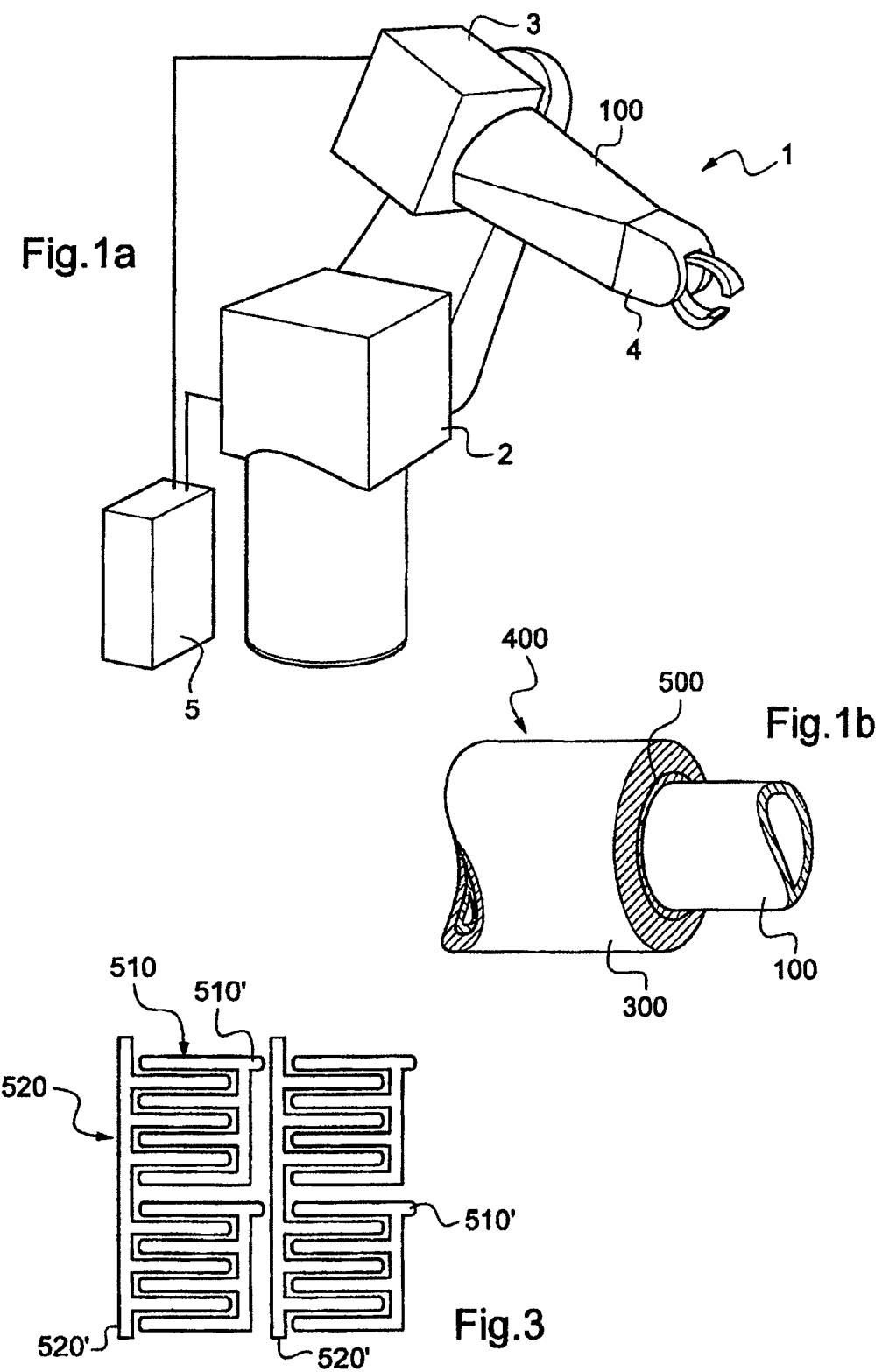

PROTECTIVE SKIN FOR ROBOTS

CROSS REFERENCE TO RELATED APPLICATIONS

This application is a National Stage of International Application No. PCT/EP2010/052470 filed Feb. 26, 2010, claiming priority based on French Patent Application No. 0900896, filed Feb. 27, 2009, the contents of all of which are incorporated herein by reference in their entirety.

The invention relates to a detector device adapted to cover at least part of a mobile appliance such as a robot or any other type of mobile machine and more particularly a mobile machine near which personnel are liable to be working. To be more precise, the application of this device is to detecting a collision in advance in order to take measures to reduce or eliminate the negative effects of that collision.

BACKGROUND OF THE INVENTION

Industrial robots are usually constructed with an architecture that is heavy and rigid. The consequences of a collision between the robot and its environment may therefore be disastrous, even at low speed: firstly there is the risk of damaging the environment, which may include fragile articles and human beings, and secondly the robot itself may be damaged in a collision with an element of the environment stronger than itself, for example a concrete wall. The problem therefore arises of limiting the consequences of collisions that may occur if a robot of high inertia moves quickly in an environment that is not static.

One solution that has been proposed is monitoring the working space of the robot by means of a multitude of fixed video cameras. Those video cameras combine data concerning the environment of the robot and data concerning the movement of the robot in that environment. The data are then processed by a computer connected to the video cameras in order to determine and predict the imminence of a collision with the environment. That solution has several drawbacks. Firstly, image processing is time-consuming, and that limits the speed at which the robot may move. Secondly, the algorithms are complex and therefore they are of only moderate reliability. Thirdly, those algorithms require considerable calculation resources. Moreover, the field of view of a video camera may be accidentally obstructed, for example if the lighting is turned down or off completely, or else in the opposite situation of excessive lighting. Video cameras are also complex pieces of equipment with a non-negligible risk of failure.

Another solution that has been proposed consists in using various devices that are capable of mechanically detecting contact between the robot and the environment. In one variant, use is made of a six-axis force sensor disposed at the base of the robot. The difficulty of such a solution is to distinguish low environment/robot contact forces that are precursors of a collision from high forces that result from the inherent dynamics and mass of the robot, not to mention the inherent noise of the sensor. In order to be able to withstand the weight of the robot, the sensor must be over-specified in comparison with the contact forces. Consequently, to obtain sufficient sensitivity it is necessary to filter the signals coming from the sensor, which is time-consuming and greatly increases the time needed to detect a collision. The same applies to systems for detecting forces on the body of the robot by measuring the motor currents, as the effect of friction in the robot must then also be taken into account.

Another solution consists in equipping the robot with bumpers associated with pressure sensors. However, when the robot is in motion, the inertia of a bumper and the stiffness of the pressure sensors make fine measurements uncertain, which may limit the sensitivity of the system when it is most needed at very beginning of the collision.

Another variant uses sensors responsive to contact forces distributed over the whole of the body of the robot. That kind of solution has the drawback that, when the robot is in motion, contact between the robot and the environment is detected too late to be able to prevent a collision.

A further solution distributes proximity sensors over the body of the robot. The distribution of the proximity sensors over the body of the robot represents a compromise between the detection distance and the number of sensors. A very short detection distance requires a large number of detectors, which is difficult to implement. In contrast, if the number of sensors is low, the detection distance is relatively large, and so the sensors may accidentally detect parts of the robot other than that to which they are fixed.

Another solution, known from Document WO 2008/066575, consists in covering a portion of the holding member of a robot with a touch-sensitive sensor, the touch-sensitive sensor including electrodes and a deformable layer of ionic liquid or gel associated with the electrodes so that a current flowing between two electrodes is proportional to the thickness of the deformable gel or liquid layer at the location of said electrodes. However, such a sensor proves complex to install, in particular when covering a large area of the robot, notably because of the need to insert each electrode through the wall of the robot, the need to connect each electrode to the input of the multiplexer placed inside the robot by means of a wire, and the need to seal the deformable layer. Covering a large area cannot be envisaged because of the difficulty of obtaining a deformable layer that is uniform over the whole of the sensor. Furthermore, on surfaces that are not plane or that are moving, gravity deforms the liquid layer of the sensor and acts in different manners thereon, causing variations of resistance between the electrodes in the absence of contact.

OBJECT OF THE INVENTION

The object of the invention is to provide a protection device for robots having the function, whatever the size of the protection device is, of reliably detecting the imminence of a collision between the body of a robot and the environment and determining its location in order to command the robot so that it avoids the impact.

BRIEF DESCRIPTION OF THE INVENTION

Against this background, there is proposed a detector device arranged so as to cover at least one portion of a mobile appliance, the device comprising an electromechanical transducer including a substrate, a first series of electrodes, a second series of electrodes, and a deformable layer associated with the electrodes of the two series, the substrate, the electrodes, and the deformable layer forming a single unit mounted on the portion of the mobile appliance and being arranged so that a current flowing between one of the electrodes of the first series and an adjacent electrode of the second series is proportional to the thickness of the deformable material layer in register with said electrodes. According to the invention the substrate includes a base layer to which there are attached the electrodes of the first series and the electrodes of the second series, which electrodes have facing portions, and a variable conduction layer that covers the base layer and the electrodes.

The detector device thus proves simple to install, even over a large area of a mobile appliance, simply by fitting the unitary assembly to the mobile appliance.

The variable conduction layer may be a layer of piezo-resistive material and may be associated with a material (e.g. foam) of chosen stiffness. The facing portions of the electrodes may be interleaved with each other and the electrodes may have a comb shape.

The invention also provides a robot comprising a motorized structure having an external surface of which at least one portion is covered by a device as described, and a control unit that is connected to at least one motor of the motorized structure and to the device and that is programmed to control the at least one motor to have the motorized structure perform a movement and to interrupt the movement as soon as a current is detected between two electrodes of the device, the deformable material layer having a thickness and a flexibility such that, for a predetermined speed of the motorized structure, the control unit is able to interrupt movement of the motorized structure before maximum crushing of the deformable layer.

The device described here makes it possible both to measure the intensity of contact with the environment and to locate the area or areas of contact on the appliance or on the body of the robot in order to deduce therefrom the broad direction of the force. The deformable material layer constitutes a surveillance area of chosen thickness around the appliance or the robot.

An advantage of the device of the invention is its ability to transmit a limited force representative of the imminence of an impact rather than the impact itself. This provides the time and distance necessary for the mechanical systems of the appliance or robot to stop it. An advantage of the device is that the choice of material for the detection layer is independent of the choice of sensor for the sensitive area.

An advantage of the device of the invention is that the deformable layer may also reduce the consequences of an impact with the operator or the environment.

One advantage is that the deformable layer protects the detection element.

Another advantage of the device of the invention is the low cost of the materials constituting it, its low production cost, and the possibility of industrial production.

BRIEF DESCRIPTION OF THE DRAWINGS

The invention becomes clearer in the light of the figures of the appended drawings, in which:

FIG. 1a is a perspective view of a robot;

FIG. 1b is a diagrammatic perspective view of a robot arm associated with a device of the invention;

FIG. 3 is a view illustrating in detail a complementary comb structure; and

DETAILED DESCRIPTION OF THE INVENTION

Figure 1C:
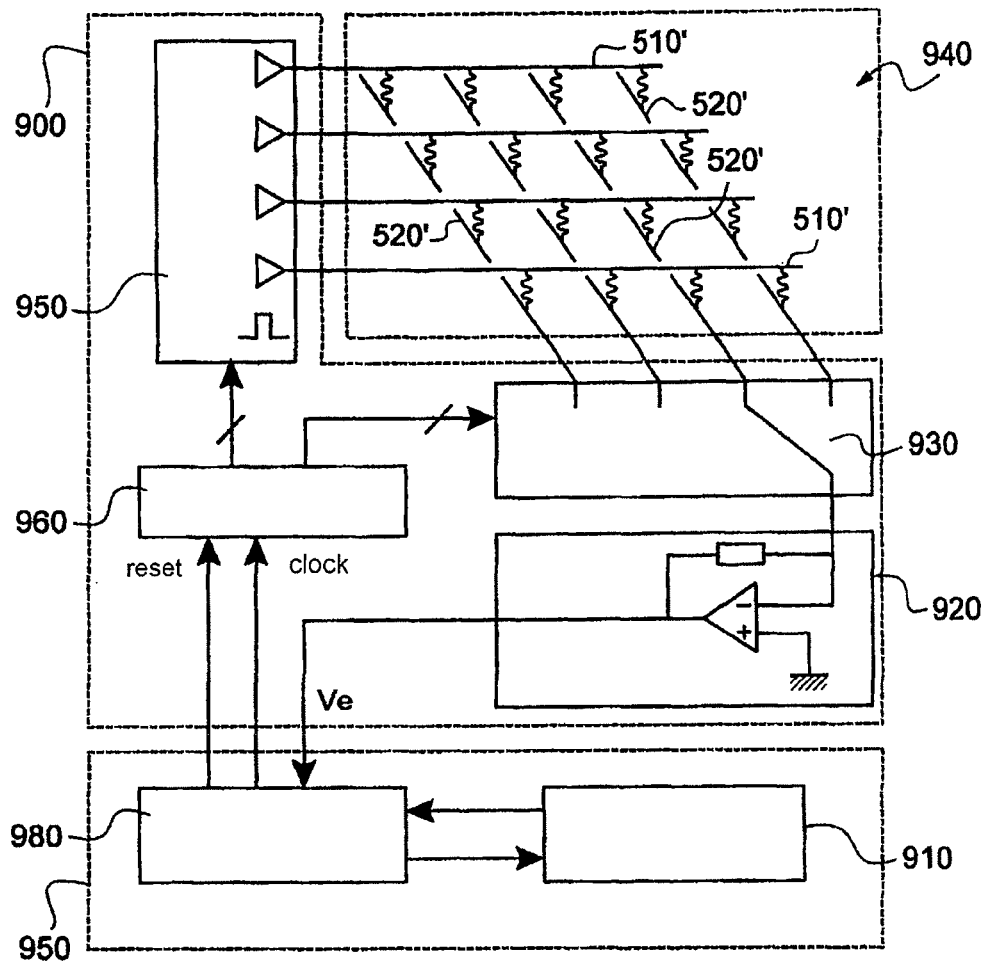
FIG. 1c is a view of a scanning and conditioning circuit connected to the skin of the invention.

FIG. 1a is a perspective view of a standard robot 1 on which the detector device of the invention may be mounted.

The robot includes a motorized structure having motors 2, 3, and 4 connected to a control unit 5 executing a computer program controlling the motorized structure. Here the motorized structure includes a robot arm 100 having an exterior surface with at least a portion thereof covered by a detector device 400 of the invention that forms a skin on the robot arm.

The device 400 includes an electromechanical transducer 500 covering the exterior surface of the robot arm 100 and including a substrate 550 provided with electrodes 510, 520 and covered by a deformable layer 300.

Figure 2:
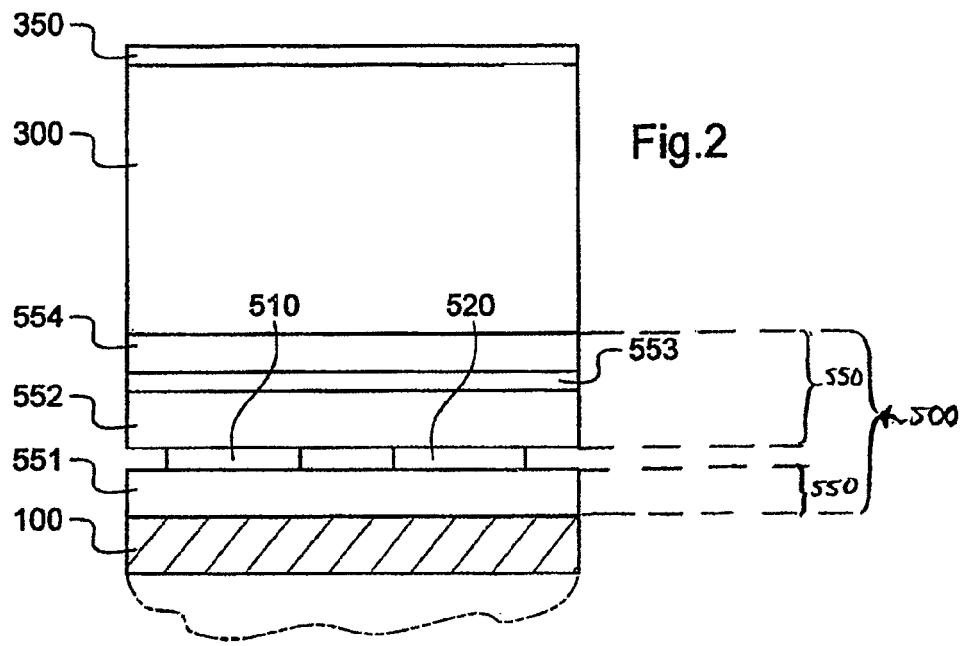
FIG. 2 is a diagrammatic view in section showing the thickness of a detector device of the invention.

The transducer is shown in detail in FIG. 2. The substrate 550 of the electromechanical transducer 500 includes a flexible base layer 551 on which the electrodes 510, 520 lie, a variable conduction layer 552 covering the base layer 551 and the electrodes 510, 520, a conductive layer 553 covering the variable conduction layer 552, and a protection layer 554 covering the conductive layer 553. The deformable layer 300 is on top of the protection layer 554 and is covered with a flexible external covering 350.

The electrodes 510, 520 have a complementary comb structure arranged in a matrix pattern, i.e. interconnected first combs along rows 510' and interconnected second combs along columns 520'. Each comb 510, 520 is connected to a scanning circuit described below and itself connected to the control unit 5. Two interleaved combs form a cell. The complementary comb structure has the function of forming large sensitive areas or cells. As the number of signals coming from the skin is a function of the size of the sensitive area or cell and a limited number of signals enables faster and simpler processing, the number of signals, i.e. the structure of the comb, may be adapted as a function of safety guidelines concerning the robot in question.

The variable conduction layer 552 is a layer of a thin and flexible material functioning as an electrically resistive element having a resistance that is a function of the pressure applied to the structure. The variable conduction layer 552 is a layer of a piezo-resistive material. A material that may be used to form the variable conduction layer 552, the conductive layer 553, and the protection layer 554 is the material sold under the name "QTC" by the supplier Peratech.

The combs of the same row or the same column are electrically connected by a flexible surface extending on top of the base layer 551 and forming a grid structure 940. This grid structure may be deformed to create most of the shapes necessary to cover a limb of a robot.

Applying a voltage between a row 510' and a column 520' makes it possible to select the sensitive area of the skin corresponding to where they cross. A measurement of the resulting current then indicates the pressure exerted on this area. The control unit 5 uses this measurement to modify or stop movement of the robot. This method is described in more detail below with reference to FIGS. 1c and 1d (note that the arrangement of the electrodes in these figures is highly schematic in order to simplify them).

FIG. 1c shows a scanning and conditioning circuit 900 connected to the skin of the invention. As indicated above, the first electrode of each cell in the same row is connected to a single track of the flexible printed circuit board (FPCB) constituting the sensor. Similarly, the second electrode of each cell in the same column is connected to a single track, which may be produced on a lower layer of the FPCB to avoid crossing points. The rows and columns are then connected to the scanning and conditioning circuit 900. The scanning and conditioning circuit 900 may be mounted on each segment of the motorized structure of the robot to preamplify and multiplex the signals. This circuit 900 includes a column selector circuit 930 connected to the columns of the grid 940 and a row activation circuit 950 connected to the rows of the grid 940. Here a 74HC238 circuit is used as the row activation circuit 950. A DG408 circuit is used as the column selector 930. The scanning and conditioning circuit 900 includes a binary counter 960. The scanning and conditioning circuit 900 also includes a conditioning circuit 920 described in more detail below and connected to the column selector 930.

A controller 990 generally located externally of the robot includes an analog to digital converter (ADC) 980 connected to a software system 910 having the function of controlling movements of the robot.

The controller 990 and the scanning and conditioning circuit 900 are connected via the management unit 980, which has an input connected to an output of the conditioning circuit 920 and two outputs connected to two inputs of the binary counter 960.

The resistance of a cell in this construction is more than 10 megohms (MΩ) when no pressure is applied and falls to less than 1 kilohm (kΩ) when strongly compressed. To detect penetration into the foam as soon as possible it is necessary, as a function of the stiffness of the foam, to measure with the shortest possible response time a resistance in the range 10 kΩ to 1 MΩ.

The function of the scanning and conditioning circuit 900 is to measure independently the conductivity of each of the cells connected to this grid. The row activation circuit 950 sets the potential of the rows to 0 volts (V) or 5 V when the column is activated. When a column is selected, that column is connected to the conditioning circuit 920, which sets its potential to 0 V. All the cells of this column are therefore subjected to a zero potential difference (PD), except for the cell connected to the activated row, which is subjected to a PD of 5 V. Because of this, the current flows only through the selected cell: this multitouch feature thus enables measurement to be performed simultaneously at a plurality of pressure points.

The binary counter 960 is used to choose columns and rows. The less significant bits address the row activation circuit 950 and the more significant bits address the column selector circuit 930. Thus the next cell of the grid is chosen on each clock pulse. A reset signal is sent to the binary counter in each cycle to be sure that scanning always starts from the beginning.

Figure 1D:
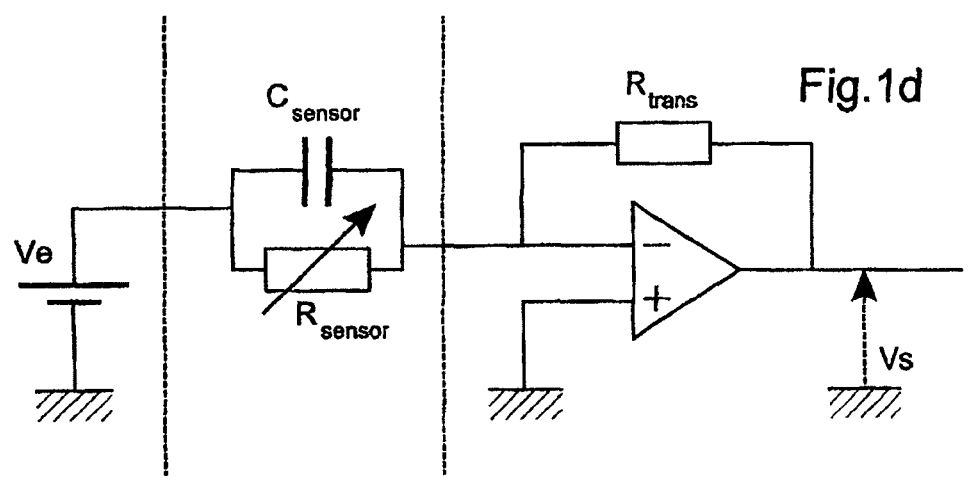
FIG. 1d is a view of a conditioning circuit.

FIG. 1d shows a conditioning circuit, here a transimpedance amplifier circuit, connected to a cell of the skin. The fact that the layer of piezo-resistive material is very thin generates a capacitive effect, which is illustrated, for a 1 centimeter (cm) cell, by a capacitor $C_{sensor}$ of approximately 1 nanofarad (nF) in parallel with a resistor $R_{sensor}$. The transimpedance amplifier circuit enables both setting a constant potential at the terminals of the cell and measuring the current crossing it. Thus it is possible to measure the variation of its conductivity without being disturbed by the capacitive effect. The response time is then greatly reduced. The measurement sensitivity may be adjusted by adjusting the value of $R_{trans}$.

The deformable layer 300 creates around the robot an active area of low stiffness with no risk of destabilizing control of the robot when the skin comes into contact with the environment. This makes it possible to switch between two controllers, a first controller when in contact and a second controller when not in contact, and thus to offer optimum performance in both situations. When the robot is not in contact, the control functions that control the execution of the main task of the robot must predominate: the motors generate fast movements to carry out the task quickly and faithfully. Conversely, if the robot involuntarily comes into contact with the environment, the control functions that guarantee safety must predominate: the motor settings generate movements of the robot to avoid a collision rather than to achieve the objectives of the main task. To guarantee stability on switching from one controller to the other, it is preferable for the transition not to be sudden, which explains the benefit of the transition area produced by the thick deformable layer 300.

Figure 4:
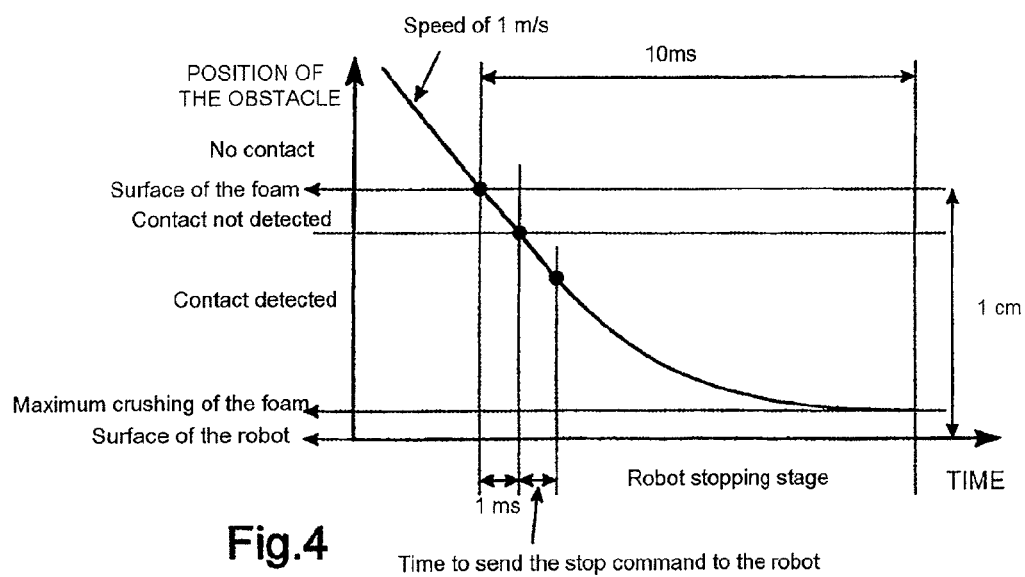
FIG. 4 is a diagram illustrating the braking of the robot.

FIG. 4 is a diagram showing the operation of the device when braking the robot. The ordinate axis shows the distance between an obstacle, the surface of the deformable layer, and the surface of the robot. The abscissa axis shows the time between detecting an obstacle and stopping the robot. It is seen in FIG. 4 that for a deformable layer thickness of approximately 1 cm and a speed of 1 meter per second (m/s) the obstacle penetrates the deformable layer for approximately 1 millisecond (ms) before contact is detected. When contact is detected, the time to send the command to stop the robot is also approximately 1 ms. The robot is stopped after approximately 8 ms, before the obstacle touches and damages the surface of the robot.

The control unit 5 is programmed to move the motorized structure and to interrupt its movement as soon as a current is detected between two electrodes of the device, the deformable layer having a thickness and a flexibility such that, for a predetermined speed of the motorized structure, the control unit 5 is able to interrupt the movement of the motorized structure before maximum crushing of the deformable layer 300.

Tests have shown that the invention enables a reaction time of the order of 1 ms.

Tests have shown that depending on the thickness of the deformable layer 300 it is possible to detect contact a few centimeters before an impact with the hard part of the robot. This makes it possible to envisage operating the robot at high speeds in order to carry out its main task (fast positioning of an object, tracking gestures of the operator, etc.), while at the same time guaranteeing the safety of the user (it is possible to comply with the necessary robot stopping distance).

The deformable layer 300 may be an elastomer foam having flexibility and thickness that are predefined depending on the required penetration force and the distance necessary to stop the movement of the robot (there is therefore a totally free choice of foam). The deformable layer 300 may be of synthetic rubber, for example polystyrene-polychloroprene, latex foam rubber, polysiloxane, a block polymer including butadiene styrene, isoprene styrene, natural rubber, or any known material having appropriate elasticity and deformability.

The function of the foam is to delay and spread an impact in order to transmit the contact information before a hard collision.

Of course, the invention is not limited to the embodiment described but rather encompasses any variant within the scope of the invention as defined by the claims.

In particular, the use of the invention is not limited to protecting a robot. The device of the invention may in particular be used as a protective skin for any moving equipment, whether moved manually or automatically, in order to protect the equipment against the environment and/or to protect the environment against the equipment.

The detector element may also be replaced by other piezo-resistive technologies such as those described in Documents U.S. Pat. No. 7,258,026 and U.S. Pat. No. 5,756,904.

Detection may employ different phenomena to vary the conductivity of the material as a function of pressure, for example:

piezo-resistivity;

a flexible material incorporating conductive particles (conductivity variation produced by percolation or tunnel effect);

contact resistance (the resistance to the passage of current between two parts is inversely proportional to their area of contact and this area of contact is increased by the pressure exerted to press the two parts together);

any combination of the above phenomena.

The invention claimed is:

1. A robot or motorized structure having an external surface of which at least one portion is covered by a detector device comprising an electromechanical transducer including a substrate, a first series of electrodes, a second series of electrodes, and a deformable material layer associated with the electrodes of the two series, wherein the substrate, the electrodes, and the deformable material layer form a single unit mounted on said portion and are arranged so that a current flowing between one of the electrodes of the first series and an adjacent electrode of the second series is proportional to a thickness of the deformable material layer in register with said electrodes, the substrate including a base layer to which are attached the electrodes of the first series and the electrodes of the second series, which have facing portions, and a variable conduction layer that covers the base layer and the electrodes, the robot or motorized structure comprising:

a control unit that is connected to at least one motor of the motorized structure and to the device and that is programmed to control the at least one motor to have the motorized structure perform a movement and to interrupt the movement as soon as a current is detected between two electrodes of the device, the deformable material layer having a thickness and a flexibility such that, for a predetermined speed of the motorized structure, the control unit is able to interrupt movement of the motorized structure before a maximum crushing of the deformable material layer.

2. The device according to claim 1, wherein the variable conduction layer is a layer of resistive conductive material.

3. The device according to claim 1, wherein the variable conduction layer is a layer of piezo-resistive material.

4. The device according to claim 1, wherein the facing portions of the electrodes are interleaved with each other.

5. The device according to claim 3, wherein the electrodes are comb-shaped.

6. The device according to claim 1, wherein the deformable material layer is a layer of foam.

7. The device according to the claim 6, wherein the deformable material layer includes an elastomer.

8. The device according to claim 1, wherein the first series of electrodes and the second series of electrodes are mounted on a common planar surface of the substrate.

9. The device according to claim 1, wherein the substrate, the electrodes, and the deformable material layer are configured in a stacked structure, wherein the first series of electrodes and the second series of electrodes are in a common plane, and wherein the deformable material layer is positioned above and extends over the first series of electrodes and the second series of electrodes.

10. The device according to claim 9, wherein there is at least one additional layer disposed between the deformable material layer and the electrodes.

* * * * *